Nov. 29, 1955 C. S. FULLER 2,725,316

METHOD OF PREPARING PN JUNCTIONS IN SEMICONDUCTORS

Filed May 18, 1953

INVENTOR
C. S. FULLER
BY [signature]
ATTORNEY

United States Patent Office 2,725,316

Patented Nov. 29, 1955

2,725,316

METHOD OF PREPARING PN JUNCTIONS IN SEMICONDUCTORS

Calvin S. Fuller, Chatham, N. J., assignor to Bell Telephone Laboratories, Incorporated, New York, N. Y., a corporation of New York Application May 18, 1953, Serial No. 355,707

5 Claims. (Cl. 148—1.5)

This invention relates to the fabrication of signal translating devices and more particularly of semiconductive bodies, such as germanium and silicon, for such devices.

The invention set forth herein is related generally to the subject-matter of my application Serial No. 320,359, filed November 14, 1952, wherein is disclosed the effect of lithium diffusion into germanium and silicon. In a more specific aspect it pertains to the formation of PN junctions in such bodies by diffusion from a molten bath.

As noted in the above-identified application semiconductive bodies, such as germanium and silicon, may be of two distinct conductivity types and such bodies may have therein two or more contiguous zones of opposite conductivity types. The conductivity type is associated with the presence or excess of one class of significant impurity, those resulting in N-type being designated donors and those resulting in P-type being designated acceptors. The boundary between contiguous N and P-type zones is commonly referred to as a PN junction. As is well known, semiconductive bodies containing such junctions find application in a variety of signal translating devices such as rectifiers, photocells and transistors.

One general object of this invention is to facilitate the fabrication of PN junctions in semiconductive bodies, particularly in silicon and germanium bodies.

Another object of this invention is to expedite the formation of zones of desired conductivity type at prescribed locations in semiconductive bodies for signal translating devices.

In accordance with one broad feature of this invention, a body of P-type germanium or silicon is immersed in a molten solution containing a small amount by weight of lithium under prescribed conditions of temperature and time to effect diffusion of lithium into the body thereby to convert a region of desired depth in the body to N conductivity type.

More specifically in accordance with one feature of this invention, a body of P-type silicon or germanium is suspended within a molten solution of ten per cent or less by weight of lithium in a low melting point metal at a temperature generally above the melting point of lithium and below that of silicon or germanium for a period of the order of minutes.

In another aspect the regions into which lithium diffusion occurs may be controlled by coating selected surfaces of the semiconductive body to prevent diffusion thereunder.

In accordance with this latter aspect of the invention, a plurality of PN junctions in a single semiconductive body may be produced by a single immersion in a lithium-alloy bath. The method of this invention thereby enables the placing of PN junctions in semiconductive bodies with a facility and control not possible heretofore.

The invention and the above-noted and other features thereof will be understood more clearly and fully from the following detailed description with reference to the accompanying drawing in which.

Figure 1:
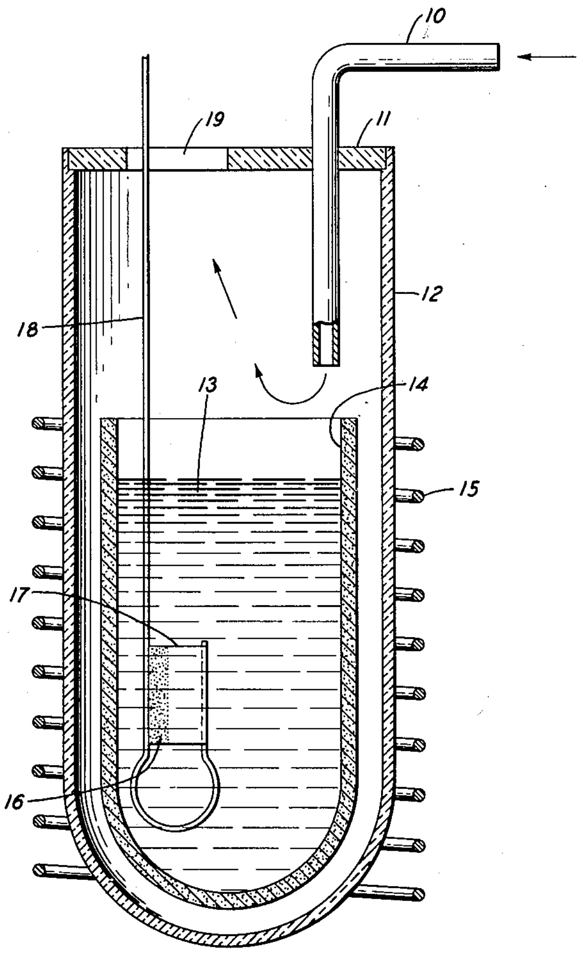
Fig. 1 is a cross-sectional view of apparatus for practicing the method of this invention.

Referring now to the drawing, there is depicted in Fig. 1 a molten lithium-alloy solution 13 within a graphite container 14 which is in turn enclosed by a glass envelope 12 and cap 11. An induction coil 15 provides means for maintaining the molten bath 13 at the desired temperature. The specimen 17 of semiconductive material, for example germanium, is supported in the looped wire 18 of suitable material, for example Chromel A, a nickel-chromium alloy. A port 19 in the cap 11 permits insertion of the specimen 17 for immersion in the bath 13. An inert atmosphere is maintained surrounding the molten solution by introduction of a suitable gas such as argon or helium through the tube 10, the gas taking the path indicated by the arrows and escaping through the port 19.

As a result of the immersion of the specimen in the molten bath, lithium diffuses into the specimen from the exposed surfaces to a depth dependent upon the temperature, the time of immersion, and the concentration of the lithium in the solution.

In order to control the region of lithium diffusion and thereby the location of the PN boundary, the specimen may be coated by a suitable masking material represented by the shaded area 16. Platings of nickel, films of sodium silicate dried at 110° C., films of graphite applied from aqueous solution and dried at 110° C., and low melting glasses fused or sintered at 600° C., applied to semiconductive body surfaces satisfactorily prevent lithium diffusion and thereby mask the regions so covered. After the diffusion treatment such masks may be removed by suitable solvents, for example concentrated hydrofluoric acid in the case of glasses.

Figure 2:
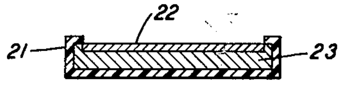
Fig. 2 is a cross-section of a diode structure produced by the method of this invention.
Figure 3:
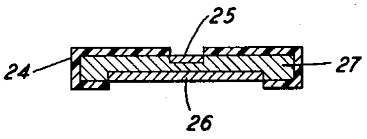
Fig. 3, similar to Fig. 2, depicts a transistor structure.

Figs. 2 and 3 illustrate the use of such masking technique for the production of desired semiconductive structures. In Fig. 2 a masking agent 21 restricts lithium diffusion to the zone 22 leaving a region of P-type material 23. In Fig. 3 the masking agent 24 is so applied as to permit lithium diffusion in zones 25 and 26 thereby producing, with the original P-region 27, an NPN structure particularly suitable for use as a transistor.

After withdrawal of the specimen from the bath the masking material is removed as previously noted and the PN boundary region is etched with an etchant, for example one composed of concentrated nitric acid, 1 part by volume, hydrofluoric acid 1 part, and water 1 part. In accordance with well-known practice connections may be made to the different conductivity zones to produce desired semiconductor devices.

In the carrying out of the method of this invention, the composition of the molten bath may be varied among a considerable variety of solutions. Generally, an amount of from one-tenth of one per cent to ten per cent by weight of lithium is employed. For specimens of a given resistivity the higher the concentration of lithium the more rapid will be the rate of diffusion of the lithium. However, as the amount of lithium in solution increases the temperature required to maintain the solution molten likewise increases. Suitable solvent metals for the production of PN junctions in silicon are antimony, aluminum, cadmium, gallium, indium, lead, magnesium, sodium, strontium, thallium, tin and zinc. Bismuth and antimony may be used advantageously when the semiconductive material is germanium.

Thus, by the method of this invention lithium diffusion in semiconductive materials is greatly simplified and rendered more controllable. For a semiconductive specimen of a given resistivity and dimensions the parameters of lithium concentration, solution temperature and time of immersion may be precisely fixed to achieve the desired results. Consequently, this method lends itself most advantageously for use in a production line type of operation to fabricate semiconductive bodies.

An example will indicate the order of magnitude of temperature and time for a specimen of known resistivity and a given concentration of lithium in solution. A specimen of silicon of resistivity=20 ohm cm. and 30 mils thick, cleaned in hydrofluoric acid (48% concentration) and dried, was immersed in a molten bath composed of 0.5 per cent by weight of lithium in pure tin. After four minutes immersion in the bath at 450° C., a PN junction parallel to the surfaces of the specimen was observed at a depth of 6 mils.

It is to be noted generally that in the practice of the method of this invention, those surfaces from which diffusion is to occur in a controlled fashion should be ground plane parallel for most advantageous results. Grinding on plate glass with No. 600 silicon carbide is exemplary of this preparatory step.

In another example, a single crystal silicon specimen 22 mils thick and having a resistivity=15 ohm cm. was coated with a low melting glass generally in the fashion illustrated in Fig. 3 of the drawing. After immersion of the specimen in 0.4 per cent concentration of lithium in tin at 480° C. for ten minutes, PN junctions were located 1.6 mils apart, indicating a depth of penetration of 10.2 mils from each unmasked face.

Another example may be cited to illustrate the technique with a specimen of lower resistivity wherein generally a greater immersion time is required. Using silicon of resistivity=0.5 ohm cm. and thickness of 12 mils PN junctions were placed 4 mils from the surface by immersion in a solution of one per cent lithium by weight in tin for 16 minutes, the bath being maintained at a temperature of 500° C.

In the examples set forth the materials used are referred to as chemically pure (C. P.) lithium and tin of 99.98 per cent purity.

Although a specific embodiment of this invention has been shown and described, it will be understood that this is but illustrative and that various modifications may be made therein without departing from the spirit and scope of this invention.

What is claimed is:

1. The method of fabricating a semiconductive body which comprises immersing a body of P-type semiconductive material selected from the group consisting of silicon and germanium in a molten solution of lithium in a low melting point metal and removing said body from said solution.

2. The method of fabricating a semiconductive body which comprises immersing a body of P-type semiconductive material selected from the group consisting of silicon and germanium in a molten solution of lithium in a low melting point metal, the lithium content of said solution being of the order of ten per cent or less by weight, maintaining said solution at a temperature of between 400° C. and the melting point of said material, and removing said body from said solution.

3. The method of producing a PN junction which comprises immersing a body of P-type semiconductive material selected from the group consisting of silicon and germanium for a period of the order of minutes, in a molten solution of lithium in a low melting point metal selected from the group consisting of antimony, aluminum, bismuth, cadmium, gallium, indium, lead, magnesium, strontium, thallium, tin, and zinc, the lithium content of said solution being of the order of ten per cent or less by weight, maintaining said solution at a temperature of between 400° C. and the melting point of said material, and removing said body from said solution.

4. The method of producing a PN junction which comprises immersing a body of P-type silicon having a resistivity of the order of 15 ohm cm. in a molten solution of 0.4 per cent by weight of lithium in tin at a temperature of approximately 450° C. for a period of the order of four minutes, and removing said body from said solution.

5. The method of producing a PN junction which comprises immersing a body of P-type silicon having a resistivity of the order of 0.5 ohm cm. in a molten solution of one per cent by weight of lithium in tin at a temperature of approximately 500° C. for a period of the order of sixteen minutes, and removing said body from said solution.

References Cited in the file of this patent

UNITED STATES PATENTS

| | | |
|---|---|---|
| 2,560,594 | Pearson | July 17, 1951 |
| 2,569,347 | Shockley | Sept. 25, 1951 |
| 2,629,672 | Sparks | Feb. 24, 1953 |

OTHER REFERENCES

Burns et al: Protective Coatings for Metals, published by Reinhold Publishing Corp., New York, 1939, pages 36 and 37.